(12) United States Patent
Shimokawa

(10) Patent No.: US 9,937,785 B2
(45) Date of Patent: Apr. 10, 2018

(54) FUEL SUPPLYING DEVICE

(71) Applicant: TOYOTA JIDOSHA KABUSHIKI KAISHA, Toyota-shi, Aichi-ken (JP)

(72) Inventor: Shinji Shimokawa, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 14/866,006

(22) Filed: Sep. 25, 2015

(65) Prior Publication Data

US 2016/0129779 A1 May 12, 2016

(30) Foreign Application Priority Data

Nov. 12, 2014 (JP) .................................. 2014-230146

(51) Int. Cl.
*B60K 15/00* (2006.01)
*B60K 15/035* (2006.01)
*B60K 15/03* (2006.01)

(52) U.S. Cl.
CPC .................. *B60K 15/03519* (2013.01); *B60K 2015/03256* (2013.01); *B60K 2015/03296* (2013.01); *B60K 2015/03538* (2013.01)

(58) Field of Classification Search
CPC .... B60K 15/03519; B60K 2015/03296; B60K 2015/03538; B60K 2015/03256
See application file for complete search history.

(56) References Cited

U.S. PATENT DOCUMENTS

| 5,657,734 A * | 8/1997 | Sawamoto ......... F02M 25/0872 |
| | | 123/516 |
| 6,851,458 B2 * | 2/2005 | Nakajima et al. ........................ |
| | | B60K 15/03519 |
| | | 123/516 |
| 7,055,556 B2 * | 6/2006 | Benjey ................. B60K 15/035 |
| | | 141/198 |
| 7,428,914 B2 * | 9/2008 | Kaneko .................... F16K 24/04 |
| | | 123/516 |
| 8,464,764 B1 * | 6/2013 | Milsom ............ B60K 15/03519 |
| | | 137/202 |
| 8,602,061 B2 * | 12/2013 | Kaneko ........... B60K 15/03519 |
| | | 137/527 |
| 2013/0213364 A1 | 8/2013 | Koukan |

FOREIGN PATENT DOCUMENTS

| CN | 103201130 A | 7/2013 |
| JP | H08-216707 A | 8/1996 |
| JP | 2006-123884 A | 5/2006 |

* cited by examiner

*Primary Examiner* — Hieu T Vo
*Assistant Examiner* — Sherman Manley
(74) *Attorney, Agent, or Firm* — Oliff PLC

(57) ABSTRACT

A fuel tank supplying device includes: a fuel tank that can accommodate fuel at an interior; a circulation flow path that is connected to an interior of the fuel tank and a fuel refueling port side, and that circulates evaporated fuel vapor that is within the fuel tank to the fuel refueling port side; a variable valve that is provided on the circulation flow path, and adjusts a circulated amount of the evaporated fuel vapor; and air-passage flow path inner diameter changing means that is provided at the variable valve, and that is for changing an inner diameter of a air-passage flow path, through which the evaporated fuel vapor flows, in accordance with internal pressure of the fuel tank, and that, when the internal pressure of the fuel tank is equal to or greater than a predetermined value, makes the inner diameter of the air-passage flow path smaller.

5 Claims, 7 Drawing Sheets

FUEL SUPPLYING DEVICE

CROSS-REFERENCE TO RELATED APPLICATION

This application claims priority under 35 USC 119 from Japanese Patent Application No. 2014-230146 filed Nov. 12, 2014, the disclosure of which is incorporated by reference herein.

BACKGROUND

Technical Field

The technique of the present disclosure relates to a fuel supplying device.

Related Art

Japanese Patent Application Laid-Open (JP-A) No. H08-216707 discloses a device having a valve that adjusts the circulated amount of evaporated fuel vapor within a breather pipe that is connected to a fuel tank. The device carries out opening of the valve in accordance with the internal pressure of the fuel tank. This device is structured such that, due to the valve within the breather pipe being opened when the internal pressure of the fuel tank becomes high, the opening surface area through which the evaporated fuel vapor can pass increases, and the circulated amount of evaporated fuel vapor within the breather pipe increases.

In JP-A No. H08-216707, the opening surface area through which the evaporated fuel vapor can pass is adjusted in light of the conditions of prescribed regulations. Therefore, under conditions other than those of the regulations, there is the possibility that the evaporated fuel vapor will be discharged-out from the fuel refueling port into the atmosphere, and there is room for improvement. It has been confirmed that this phenomenon occurs in particular in cases in which the internal pressure of the fuel tank is high.

SUMMARY

An object of an embodiment of the present invention is to provide a fuel supplying device that, when the internal pressure of a fuel tank is high, can prevent or suppress the discharging of evaporated fuel vapor from a fuel refueling port into the atmosphere.

A fuel supplying device relating to a first aspect of the present invention includes: a fuel tank that can accommodate fuel at an interior thereof; a circulation flow path that is connected to the interior of the fuel tank and to a fuel refueling port side, and that circulates evaporated fuel vapor that is within the fuel tank to the fuel refueling port side; a variable valve that is provided at the circulation flow path, and that adjusts a circulated amount of the evaporated fuel vapor; and an air-passage flow path inner diameter changing means that is provided at the variable valve, and that is for changing an inner diameter of an air-passage flow path, through which the evaporated fuel vapor flows, in accordance with an internal pressure of the fuel tank, and that, when the internal pressure of the fuel tank is equal to or greater than a predetermined value, makes the inner diameter of the air-passage flow path smaller.

In accordance with the fuel supplying device relating to the first aspect of the present invention, the circulation flow path is connected to the fuel tank interior and the fuel refueling port side, and the evaporated fuel vapor that is within the fuel tank flows through the circulation flow path and is circulated to the fuel refueling port side. The variable valve, that adjusts the circulated amount of the evaporated fuel vapor, is provided on the circulation flow path. The air-passage flow path inner diameter changing means, that, in accordance with the internal pressure of the fuel tank, changes the inner diameter of the air-passage flow path through which the evaporated fuel vapor flows, is provided at the variable valve. When the internal pressure of the fuel tank is equal to or greater than a predetermined value, the air-passage flow path inner diameter changing means makes the inner diameter of the air-passage flow path smaller. Due thereto, when the internal pressure of the fuel tank is equal to or greater than the predetermined value, the circulated amount of the evaporated fuel vapor that flows through the circulation flow path is decreased due to the inner diameter of the air-passage flow path being made small by the air-passage flow path inner diameter changing means. Therefore, as compared with a structure in which the inner diameter of the air-passage flow path does not change when the internal pressure of the fuel tank is equal to or greater than a predetermined value, the circulated amount of the evaporated fuel vapor is reduced, and, due thereto, the evaporated fuel vapor that is circulated to the fuel refueling port side being discharged from the fuel refueling port into the atmosphere can be prevented or suppressed.

A fuel supplying device according to a second aspect of the present invention is the first aspect of the present invention, wherein changing of the inner diameter of the air-passage flow path is carried out by fluid pressure of the evaporated fuel vapor that flows through the variable valve.

In accordance with the fuel supplying device relating to the second aspect of the present invention, the changing of the inner diameter of the air-passage flow path is carried out by the fluid pressure of the evaporated fuel vapor that flows through the variable valve. Therefore, changing of the inner diameter of the air-passage flow path is easy, and there is no need to provide a driving device for changing the inner diameter of the air-passage flow path, and a decrease in cost is possible.

A fuel supplying device according to a second aspect of the present invention is the first aspect or the second aspect of the present invention, wherein the air-passage flow path inner diameter changing means is structured so as to, when the internal pressure of the fuel tank is less than the predetermined value, make the inner diameter of the air-passage flow path smaller, and, when the internal pressure of the fuel tank is equal to or greater than a second predetermined value, make the inner diameter of the air-passage flow path larger, and further, when the internal pressure of the fuel tank is equal to or greater than the predetermined value, which is greater than the second predetermined value, make the inner diameter of the air-passage flow path smaller.

In accordance with the fuel supplying device relating to the third aspect of the present invention, the air-passage flow path inner diameter changing means makes the inner diameter of the air-passage flow path smaller when the internal pressure of the fuel tank is less than the predetermined value, and makes the inner diameter of the air-passage flow path large when the internal pressure of the fuel tank is equal to or greater than the second predetermined value. Due thereto, for example, in a case of refueling fuel under the conditions of the regulations, when the refueled amount per unit time is large and the internal pressure of the fuel tank is equal to or greater than the second predetermined value, the circulated amount of the evaporated fuel vapor can be made to be large by making the inner diameter of the air-passage flow path large. Moreover, when the refueled amount per unit time is even larger and the internal pressure of the fuel tank is equal to or greater than a predetermined value that is larger than the second predetermined value, the circulated amount of the evaporated fuel vapor is reduced due to the air-passage flow path inner diameter changing means making the inner diameter of the air-passage flow path smaller. Due thereto, for example, in a case of refueling under conditions that are other than the regulations, due to the circulated amount of the evaporated fuel vapor being reduced, the evaporated fuel vapor being discharged from the fuel refueling port into the atmosphere can be prevented or suppressed.

A fuel supplying device according to a fourth aspect of the present invention is the third aspect of the present invention, wherein: the air-passage flow path inner diameter changing means has a valve body that is disposed with an interval between the valve body and an inner wall of the variable valve, and that moves within the variable valve in accordance with the internal pressure of the fuel tank, and through-holes, through which the evaporated fuel vapor flows, are provided in the valve body.

In accordance with the fuel supplying device relating to the fourth aspect of the present invention, the air-passage flow path inner diameter changing means has the valve body that is disposed with an interval between the valve body and the inner wall of the variable valve, and through-holes through which the evaporated fuel vapor flows are provided in the valve body. Due thereto, due to the valve body moving within the variable valve in accordance with the internal pressure of the fuel tank, the inner diameter of the air-passage flow path can be changed easily.

A fuel supplying device according to a fifth aspect of the present invention is the fourth aspect of the present invention, wherein the air-passage flow path inner diameter changing means is structured such that: when the internal pressure of the fuel tank is less than the predetermined value, the valve body is positioned at a fuel tank side of the variable valve interior, and the evaporated fuel vapor flows through the through-holes; when the internal pressure of the fuel tank is equal to or greater than the second predetermined value, the valve body moves to an axial direction intermediate portion of the variable valve interior, and the evaporated fuel vapor flows through the through-holes and between the valve body and the inner wall; and when the internal pressure of the fuel tank further is equal to or greater than the predetermined value, the valve body moves to the fuel refueling port side of the variable valve interior, and the evaporated fuel vapor flows through the through-holes.

In accordance with the fuel supplying device relating to the fifth aspect of the present invention, when the internal pressure of the fuel tank is less than the predetermined value, the valve body is positioned at the fuel tank side of the variable valve interior, and the evaporated fuel vapor flows through the through-holes. Therefore, the circulated amount of the evaporated fuel vapor can be adjusted by the diameter of the through-holes. Further, when the internal pressure of the fuel tank is equal to or greater than the second predetermined value, the valve body moves to an axial direction intermediate portion of the variable valve interior, and the evaporated fuel vapor flows through the through-holes and between the valve body and the inner wall. Therefore, the inner diameter of the air-passage flow path becomes large, and the circulated amount of the evaporated fuel vapor can be increased. Moreover, when the internal pressure of the fuel tank is equal to or greater than the predetermined value, the valve body moves to the fuel refueling port side of the variable valve interior, and the evaporated fuel vapor flows through the through-holes. Therefore, the inner diameter of the air-passage flow path becomes small, and the circulated amount of the evaporated fuel vapor can be reduced. Due thereto, when the internal pressure of the fuel tank is equal to or greater than the predetermined value, discharging of the evaporated fuel vapor from the fuel refueling port into the atmosphere can be prevented or suppressed more reliably.

In accordance with an embodiment of the present invention, in a case in which the internal pressure of the fuel tank is high, discharging of evaporated fuel vapor from a fuel refueling port into the atmosphere can be prevented or suppressed.

BRIEF DESCRIPTION OF THE DRAWINGS

Exemplary embodiments of the present invention will be described in detail based on the following figures, wherein.

DETAILED DESCRIPTION

An embodiment of a fuel supplying device relating to the technique of the present disclosure is described hereinafter by using FIG. 1 through FIG. 6.

Figure 1:
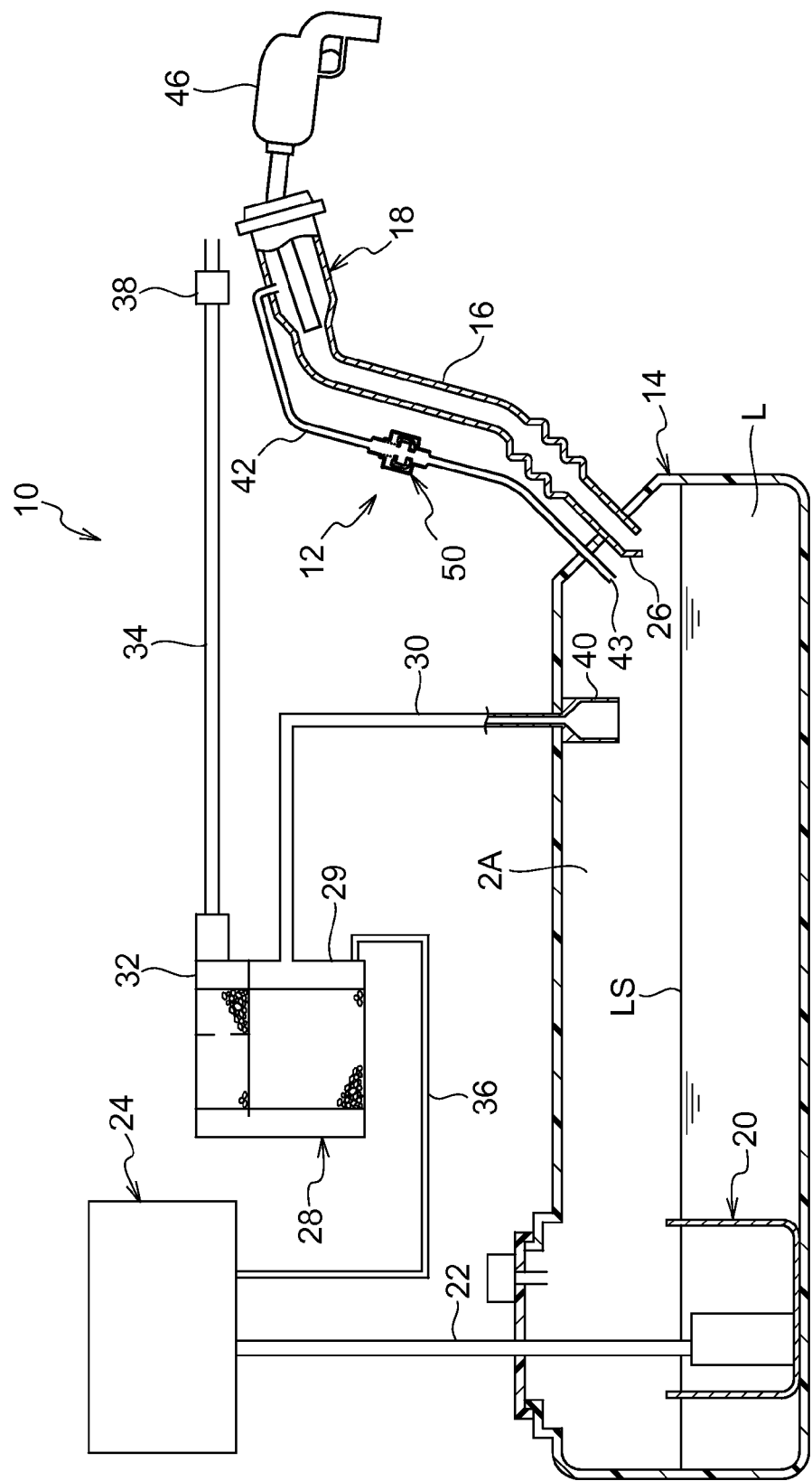
FIG. 1 is a schematic structural drawing showing a fuel tank system that is equipped with a fuel supplying device of an embodiment of the present invention.

A fuel tank system 10, that is equipped with a fuel supplying device 12 of the present embodiment, is shown in FIG. 1. This fuel tank system 10 is installed in an automobile, and is used for supplying fuel to an engine.

The fuel tank system 10 has a fuel tank 14 that can accommodate fuel at the interior thereof. The lower end of an inlet pipe 16 is connected to the upper portion of the fuel tank 14. A refueling gun 46 of a refueling device is connected to a fuel refueling port 18 provided at the upper end of the inlet pipe 16, and the fuel tank 14 can be refueled. Due to a fuel pump 20 being driven, fuel L within the fuel tank 14 is supplied through a fuel supply pipe 22 to an engine 24.

A flapper valve 26 is mounted to the lower end of the inlet pipe 16. When fuel moves from the inlet pipe 16 to the fuel tank 14, the flapper valve 26 is opened and permits movement of the fuel, but, when fuel moves in the opposite direction, the flapper valve 26 is closed and inhibits movement of the fuel in this opposite direction.

A canister 28 in whose interior activated carbon is filled is provided above the fuel tank 14, and the canister 28 and the fuel tank 14 are connected by a vapor pipe 30. The canister 28 adsorbs evaporated fuel vapor that is generated at the time of refueling for example, and desorbs the evaporated fuel vapor at times when the vehicle travels and the like. A pipe 34 for opening to the atmosphere is connected to an atmosphere-side port 32 of the canister 28. A vapor layer 2A at the upper portion of the fuel tank 14 interior communicates with external air through the pipe 34 for opening to the atmosphere that is connected to the vapor pipe 30 via the canister 28.

Further, a purge pipe 36 to the engine 24 is connected to a purge port 29 of the canister 28. At the time of purging of the canister 28, the evaporated fuel that has been desorbed is sent through the purge pipe 36 to the engine 24. Further, one end of the pipe 34 for opening to the atmosphere is connected to the canister 28, and a filter 38, for purifying introduced atmospheric air (air), is provided at the other end of the pipe 34 for opening to the atmosphere. Namely, the other end of the pipe 34 for opening to the atmosphere is open to the atmosphere via the filter 38 in a vicinity of the upper end of the inlet pipe 16. When the vapor, that includes the evaporated fuel vapor that is within the fuel tank 14, is introduced through the vapor pipe 30 into the canister 28, the evaporated fuel within the vapor is adsorbed by the adsorbent (activated carbon) that is within the canister 28, and the vapor is released into the atmosphere from the pipe 34 for opening to the atmosphere. Further, at the time of purging of the canister 28, atmospheric air is introduced into the canister 28 through the pipe 34 for opening to the atmosphere.

A fill-up regulating valve 40, that has a float-shaped valve body (not illustrated), is provided at the lower end of the vapor pipe 30. Even in cases in which a liquid surface LS of the fuel L rises at the time of refueling, the valve body of the fill-up regulating valve 40 does not close the vapor pipe 30 until the liquid surface LS reaches a vicinity of the fill-up regulating valve 40, and the vapor within the fuel tank 14 moves from the vapor pipe 30 to the canister 28. At the canister 28, after the evaporated fuel within the vapor is adsorbed by the activated carbon, the vapor passes through the pipe 34 for opening to the atmosphere and is released into the atmosphere. Therefore, the refueling is not impeded. In contrast, when the liquid surface LS reaches a vicinity of the fill-up regulating valve 40 and the valve body floats in the fuel and closes the vapor pipe 30, from thereafter, the vapor within the fuel tank 14 can no longer move to the canister 28.

The fuel tank system 10 has the fuel supplying device 12 of the present embodiment. The fuel supplying device 12 has the fuel tank 14, and a breather pipe 42 that serves as an example of a circulation flow path and that is connected to the fuel tank 14 interior and the upper portion (the fuel refueling port 18 side) of the inlet pipe 16. Moreover, the fuel supplying device 12 has a variable valve 50 that is disposed midway along the breather pipe 42 and adjusts the circulated amount of the evaporated fuel vapor.

The lower end of the breather pipe 42 is made to be an opening portion 43, and the lower end of the breather pipe 42 is positioned at the upper portion of the fuel tank 14 interior (higher than the lower end of the inlet pipe 16). The upper end of the breather pipe 42 opens at the upper portion of the inlet pipe 16. In the fuel supplying device 12, by utilizing the fact that the internal pressure of the fuel tank 14 rises at times of refueling, some of the evaporated fuel vapor that is within the fuel tank 14 is passed through the breather pipe 42 and is circulated to the upper portion of the inlet pipe 16 (the fuel refueling port 18 side). Due thereto, the dragged-in amount of new air, that enters into the upper portion of the inlet pipe 16 from the fuel refueling port 18, is reduced, and the amount of vapor that is generated is suppressed. Due thereto, the total amount of evaporated fuel vapor that is generated up to the time when the tank is refueled to full is reduced.

Figure 2:
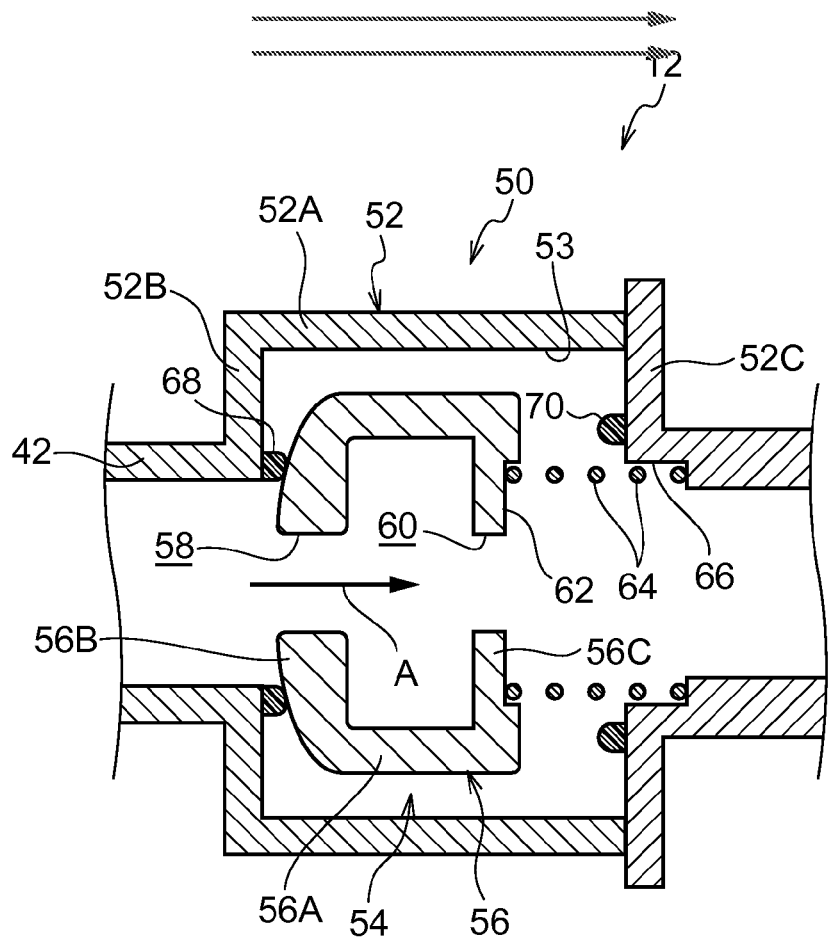
FIG. 2 is a side sectional view showing the state of a variable valve, that is used in the fuel supplying device shown in FIG. 1, in a case in which internal pressure of a fuel tank is low.

The variable valve 50 is shown in FIG. 2 in a side sectional view along the axial direction. As shown in FIG. 2, the variable valve 50 has a case 52 that is substantially shaped as a cylindrical tube, and air-passage flow path inner diameter changing means 54 for changing the air-passage communication diameter, at which the evaporated fuel vapor flows within the case 52, in accordance with the internal pressure of the fuel tank 14. The air-passage flow path inner diameter changing means 54 has a valve body 56 that moves within the variable valve 50 in accordance with the internal pressure of the fuel tank 14 (see FIG. 1).

The case 52 has a peripheral wall portion 52A that is substantially shaped as a cylindrical tube and whose outer diameter is formed to be larger than the outer diameter of the breather pipe 42, and a front wall portion 52B that is disposed at the radial direction inner side from the fuel tank 14 (see FIG. 1) side end portion of the peripheral wall portion 52A and that is connected to the breather pipe 42 that is at the fuel tank 14 side. Further, the case 52 has a rear wall portion 52C that is disposed at the radial direction inner side from the end portion at the side opposite the fuel tank 14 of the peripheral wall portion 52A, and is connected to the breather pipe 42 that is at the fuel refueling port 18 (see FIG. 1) side. In the present embodiment, the peripheral wall portion 52A and the front wall portion 52B and the breather pipe 42 that is at the fuel tank 14 side are structured integrally. Note that the variable valve 50 is not limited to this structure, and the front wall portion 52B and the breather pipe 42 that is at the fuel tank 14 side may be structured as separate bodies and joined by adhesion or the like. Further, in the present embodiment, the rear wall portion 52C and the breather pipe 42 that is at the fuel refueling port 18 side are structured integrally, and the peripheral wall portion 52A and the rear wall portion 52C are structured as separate bodies and are joined by adhesion or the like. Note that the variable valve 50 is not limited to this structure, and may be another structure.

The outer diameter of the valve body 56 is structured to be larger than the outer diameter of the breather pipe 42 and smaller than the inner diameter of the peripheral wall portion 52A of the case 52. Namely, the valve body 56 is disposed with an interval between the valve body 56 and an inner wall 53 of the peripheral wall portion 52A.

Figure 3:
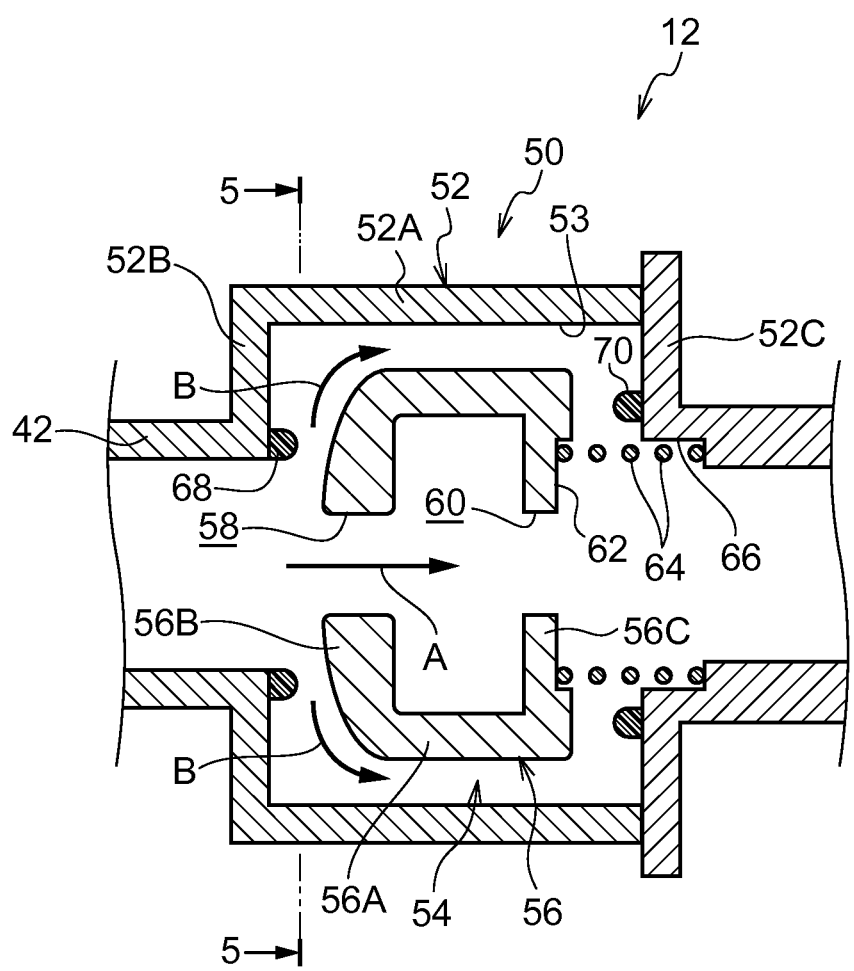
FIG. 3 is a side sectional view showing the state of the variable valve, that is used in the fuel supplying device shown in FIG. 1, in a case in which the internal pressure of the fuel tank is equal to or greater than a second predetermined value.
Figure 5:
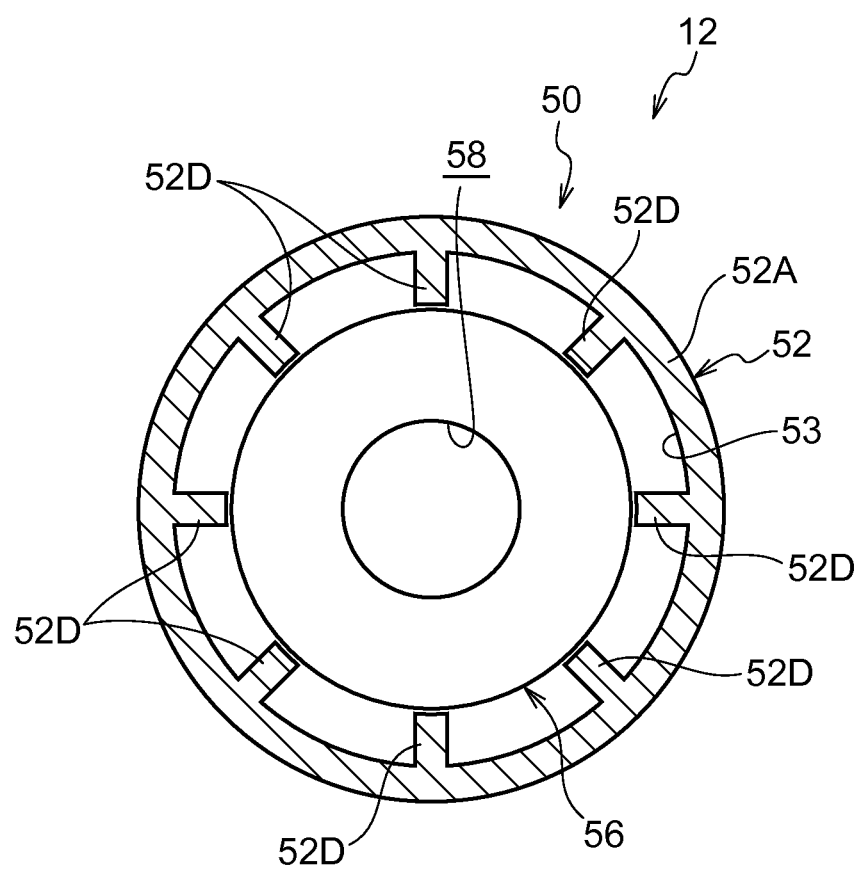
FIG. 5 is a cross-sectional view in a direction orthogonal to the axial direction of the variable valve that is used in the fuel supplying device shown in FIG. 1 (a cross-sectional view along line 5-5 of FIG. 3)

The variable valve 50 is shown in FIG. 5 in a cross-sectional view in a direction orthogonal to the axial direction (a cross-sectional view along line 5-5 of FIG. 3). As shown in FIG. 5, plural ribs 52D that project-out toward the radial direction inner side and guide the valve body 56, are provided at the inner wall 53 of the peripheral wall portion 52A of the case 52. In the present embodiment, eight of the ribs 52D are provided at substantially uniform intervals along the peripheral direction of the inner wall 53. Note that the number of the ribs 52D is not limited to that of the structure of the present embodiment and can be changed.

The inner diameter of the end surfaces of the ribs 52D is structured to be larger than the outer diameter of the valve body 56. Due thereto, the valve body 56 moves along the axial direction of the case 52 while being guided by the plural ribs 52D. In the present embodiment, the ribs 52D are molded from resin and integrally with the peripheral wall portion 52A of the case 52, but guides that are separate bodies may be fixed by adhesion or the like to the peripheral wall portion 52A of the case 52.

As shown in FIG. 2, the outer diameter of the valve body 56 is formed in a substantially rectangular shape, and the valve body 56 has a peripheral wall portion 56A that is substantially cylindrical tube shaped and is disposed along the axial direction, and a front side wall portion 56B that extends toward the radial direction inner side from the fuel tank 14 side (see FIG. 1) end portion of the peripheral wall portion 56A, and a rear wall portion 56C that extends toward the radial direction inner side from the end portion, at the side opposite the fuel tank 14, of the peripheral wall portion 56A. The outer surface of the front side wall portion 56B is made to be a curved surface that protrudes-out toward the fuel tank 14 side while heading toward the radial direction inner side from the radial direction outer side end portion that is continuous with the peripheral wall portion 56A. A through-hole 58 that passes-through the front side wall portion 56B along the axial direction is provided in the central portion of the front side wall portion 56B. In the present embodiment, diameter φ of the through-hole 58 is set to be around 3 mm for example, but the diameter of the through-hole 58 can be changed.

The rear side wall portion 56C is disposed along a direction orthogonal to the axial direction, from the radial direction outer side end portion that is continuous with the peripheral wall portion 56A. A through-hole 60 that passes-through the rear side wall portion 56C along the axial direction is provided in the central portion of the rear side wall portion 56C. The through-hole 60 is disposed so as to match the position of the through-hole 58 of the front side wall portion 56B. In the present embodiment, the inner diameter of the through-hole 60 is set to be substantially the same as the inner diameter of the through-hole 58, but the present invention is not limited to this. For example, the inner diameter of the through-hole 60 may be set to be larger than the inner diameter of the through-hole 58. Further, in the present embodiment, the through-hole 58 of the front side wall portion 56B and the through-hole 60 of the rear side wall portion 56C are provided separately. However, a single through-hole, that passes-through the central portion of valve body 56 along the axial direction, may be provided.

A recessed portion 62, that is recessed toward the axial direction inner side, is formed in the outer surface (the surface at the side opposite the fuel tank 14) of the rear side wall portion 56C. One end of a coil spring 64 that is disposed along the axial direction of the case 52 is supported at the outer surface of the recessed portion 62. Further, a recessed portion 66, that is recessed toward the radial direction outer side, is formed in the inner wall surface of the breather pipe 42 at the side opposite the fuel tank 14, at the portion thereof that is connected to the rear wall portion 52C of the case 52. The other end of the coil spring 64 is supported at the end wall (the surface that runs along the radial direction) of the recessed portion 66. Due thereto, the valve body 56 is urged toward the front wall portion 52B side of the case 52 by the force of the coil spring 64.

A protrusion 68 that projects-out toward the valve body 56 side is provided at the inner surface of the front wall portion 52B of the case 52. As seen in the axial direction of the case 52, the protrusion 68 is made to be an annular body that is substantially circular and is continuous in the peripheral direction. As seen in a side sectional view, the outer surface (the surface at the valve body 56 side) of the protrusion 68 is made to be a curved surface that is a smooth, substantial U-shape. In the present embodiment, the protrusion 68 is made of rubber, and is fixed to the inner surface of the front wall portion 52B by adhesion or the like. Note that the material and the shape of the protrusion 68 are not limited to this structure and can be changed.

Similarly, a protrusion 70 that projects-out toward the valve body 56 side is provided at the inner surface of the rear wall portion 52C of the case 52. As seen in the axial direction of the case 52, the protrusion 70 is made to be an annular body that is substantially circular and is continuous in the peripheral direction. As seen in a side sectional view, the outer surface (the surface at the valve body 56 side) of the protrusion 70 is made to be a curved surface that is a smooth, substantial U-shape. In the present embodiment, the protrusion 70 is made of rubber, and is fixed to the inner surface of the front wall portion 52B by adhesion or the like. However, the material and the shape of the protrusion 70 can be changed.

As shown in FIG. 1, when the refueling speed (the refueled amount per unit time) of the fuel that is supplied from the fuel refueling port 18 through the inlet pipe 16 is low, the internal pressure of the fuel tank 14 is low. As shown in FIG. 2, in the state in which the internal pressure of the fuel tank 14 is low (the internal pressure is lower than a predetermined value and a second predetermined value that are described later), due to the valve body 56 being urged toward the front wall portion 52B side of the case 52 by the force of the coil spring 64, the front side wall portion 56B of the valve body 56 is made to press-contact the protrusion 68. There is a structure in which, in this state, the evaporated fuel vapor from the fuel tank 14 flows through the through-hole 58, that is an example of a air-passage flow path, of the valve body 56 as shown by arrow A, and the inner diameter of the air-passage flow path of the variable valve 50 (in other words, the air-passage flow path opening surface area in the direction orthogonal to the axial direction) is small. In the present embodiment, the inner diameter of the air-passage flow path at the position where the air-passage flow path is narrowest in the direction orthogonal to the axial direction (the air-passage flow path opening surface area at the narrowest position in the direction orthogonal to the axial direction) is made to be, for example, around φ3 mm which is the diameter of the through-hole 58.

As shown in FIG. 1, when the refueling speed of the fuel is high, the internal pressure of the fuel tank 14 becomes high. In correspondence therewith, the amount of the evaporated fuel vapor becomes large, and the fluid pressure of the evaporated fuel vapor that flows through the breather pipe 42 becomes high. As shown in FIG. 3, when the internal pressure of the fuel tank 14 is equal to or greater than the second predetermined value (internal pressure 6A in FIG. 6), the valve body 56 moves within the case 52 toward the side opposite the fuel tank 14 due to the fluid pressure of the evaporated fuel vapor and against the force of the coil spring 64, and the valve body 56 is positioned at an axial direction intermediate portion of the case 52 interior. Due thereto, there is a state in which the valve body 56 is apart from the protrusion 68, and the evaporated fuel vapor flows through the through-hole 58, that serves as an example of the air-passage flow path, of the valve body 56 as shown by arrow A, and in the space (the air-passage flow path) between the peripheral wall portion 56A of the valve body 56 and the peripheral wall portion 52A (the inner wall 53) of the case 52 as shown by arrows B. Namely, the inner diameter of the air-passage flow path of the variable valve 50 (the air-passage flow path opening surface area in the direction orthogonal to the axial direction) increases. In the present embodiment, for example, the inner diameter of the air-passage flow path at the position where the air-passage flow path is narrowest in the direction orthogonal to the axial direction (the air-passage flow path opening surface area at the narrowest position in the direction orthogonal to the axial direction) is equivalent to, for example, around φ6 mm.

Among the refueling conditions that are prescribed by regulations, the refueling speed is made to be 15 L/min to 38 L/min. Under this refueling condition, in order to maximize the circulated amount of the evaporated fuel vapor and reduce the load on the evaporation system such as the canister 28 and the like, the inner diameter of the air-passage flow path of the variable valve 50 is increased as shown in FIG. 3. In the present embodiment, the second predetermined value is set to be an internal pressure of the fuel tank 14 that corresponds to a predetermined refueling speed between 15 L/min to 38 L/min.

Figure 4:
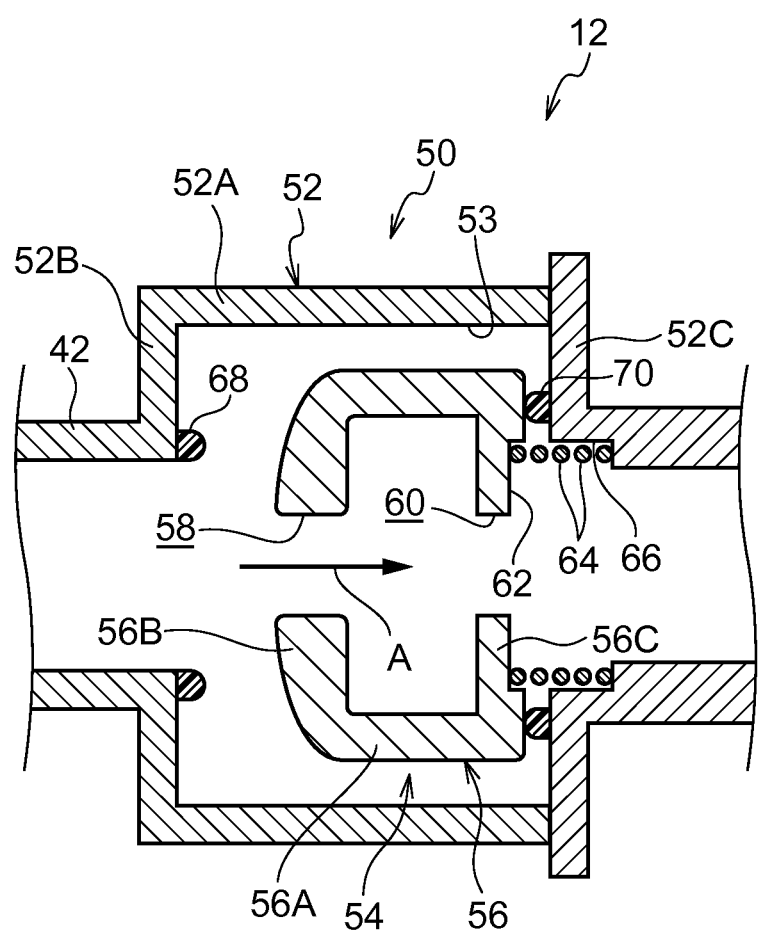
FIG. 4 is a side sectional view showing the state of the variable valve, that is used in the fuel supplying device shown in FIG. 1, in a case in which the internal pressure of the fuel tank is equal to or greater than a predetermined value that is higher than the second predetermined value.

Further, as shown in FIG. 4, when the refueling speed of the fuel is higher than the state shown in FIG. 3, the internal pressure of the fuel tank 14 becomes even higher. When the internal pressure of the fuel tank 14 is equal to or greater than a predetermined value (internal pressure 6B in FIG. 6, a first predetermined value) that is greater than the second predetermined value, the valve body 56 moves within the case 52 toward the side opposite the fuel tank 14 due to the fluid pressure of the evaporated fuel vapor and against the force of the coil spring 64, and the rear side wall portion 56C of the valve body 56 is made to press-contact the protrusion 70. In this state, the evaporated fuel vapor from the fuel tank 14 flows through the through-hole 58, that is an example of the air-passage flow path, of the valve body 56 as shown by arrow A, and the inner diameter of the air-passage flow path of the variable valve 50 (the air-passage flow path opening surface area in the direction orthogonal to the axial direction) becomes smaller. In the present embodiment, the inner diameter of the air-passage flow path at the position where the air-passage flow path is narrowest in the direction orthogonal to the axial direction (the air-passage flow path opening surface area at the narrowest position in the direction orthogonal to the axial direction) is, for example, around φ3 mm which is the diameter of the through-hole 58.

In this fuel supplying device 12, when the internal pressure of the fuel tank 14 becomes high, due to the flow rate of the evaporated fuel vapor becoming high in accordance with the internal pressure, the valve body 56 of the variable valve 50 moves in the axial direction. At this time, from the state shown in FIG. 2 in which the inner diameter of the air-passage flow path of the variable valve 50 is small, due to the internal pressure of the fuel tank 14 increasing, there becomes the state shown in FIG. 3 in which the inner diameter of the air-passage flow path of the variable valve 50 is large. Moreover, due to the internal pressure of the fuel tank 14 increasing, there becomes the state shown in FIG. 4 in which the inner diameter of the air-passage flow path of the variable valve 50 is small. Namely, there is a structure in which, when the internal pressure of the fuel tank 14 becomes high, in accordance with that internal pressure, the inner diameter of the air-passage flow path of the variable valve 50 shown in FIG. 2 (the air-passage flow path opening surface area in the direction orthogonal to the axial direction) varies in two stages as shown in FIG. 3 and FIG. 4. The air-passage flow path inner diameter changing means 54 can also be called an opening surface area changing means that changes the air-passage flow path opening surface area of the variable valve 50 in the direction orthogonal to the axial direction.

Operation and effects of the fuel supplying device 12 of the present embodiment are described next.

Figure 6:
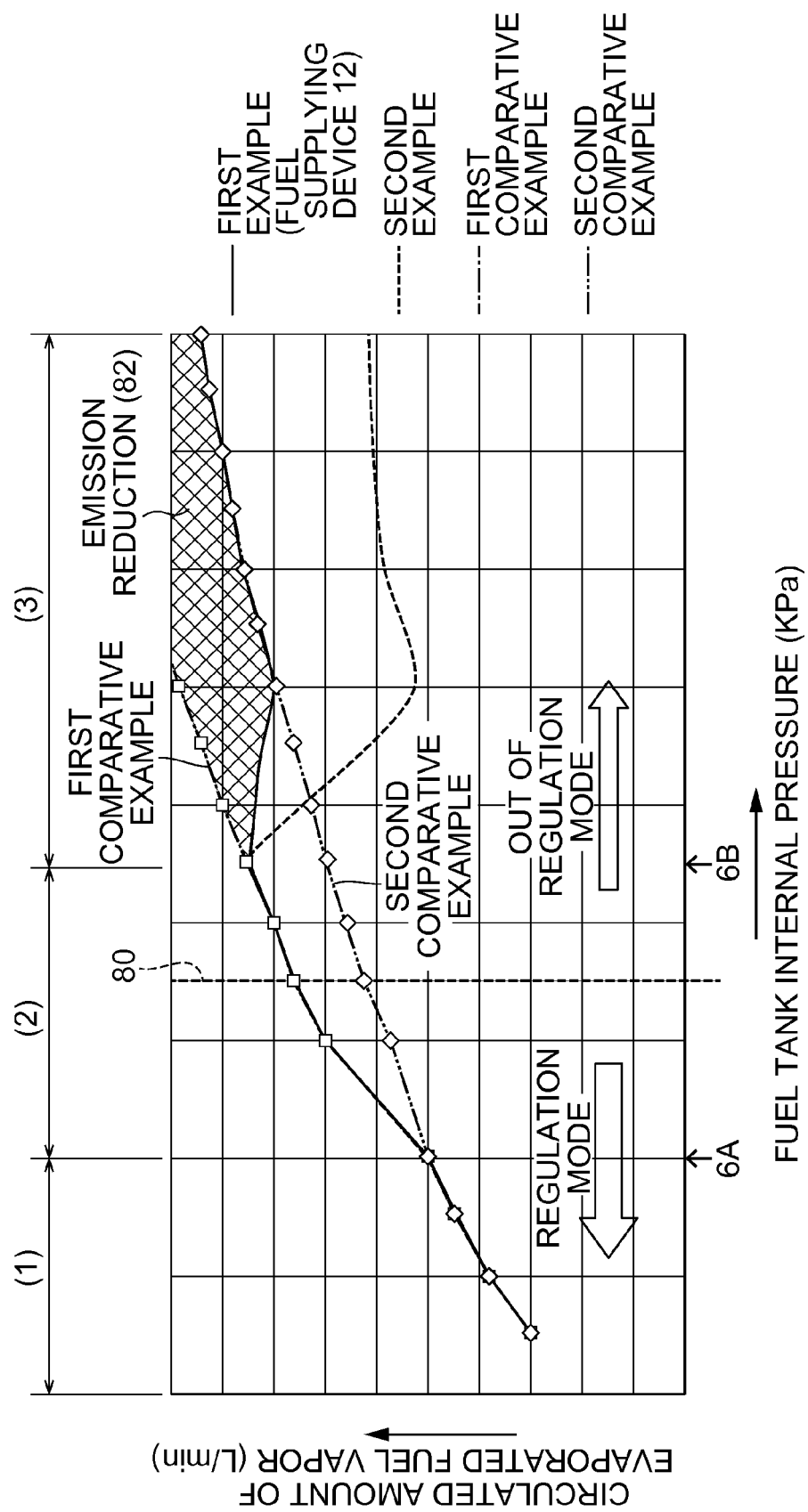
FIG. 6 is a graph showing the relationship between circulated amount of evaporated fuel vapor and internal pressure of a fuel tank, in a First Example, a Second Example, a First Comparative Example, and a Second Comparative Example.

In the fuel supplying device 12, at the time of refueling the fuel tank 14 from the fuel refueling port 18 through the inlet pipe 16, when the refueling speed of the fuel is high, the internal pressure of the fuel tank 14 becomes high. The relationship between internal pressure (KPa) of the fuel tank 14, and the circulated amount (L/min) of the evaporated fuel vapor that is circulated through the breather pipe 42, is shown in a graph in FIG. 6. In FIG. 6, a First Example that is shown by the solid line is the fuel supplying device 12 of the present embodiment. Further, a Second Example shown by the dotted line is a structure in which the inner diameters of the through-holes of the valve body of the variable valve 50 of the fuel supplying device 12 are made to be small, and the circulated amount of the evaporated fuel vapor at the time of high pressure is reduced.

Figure 7:
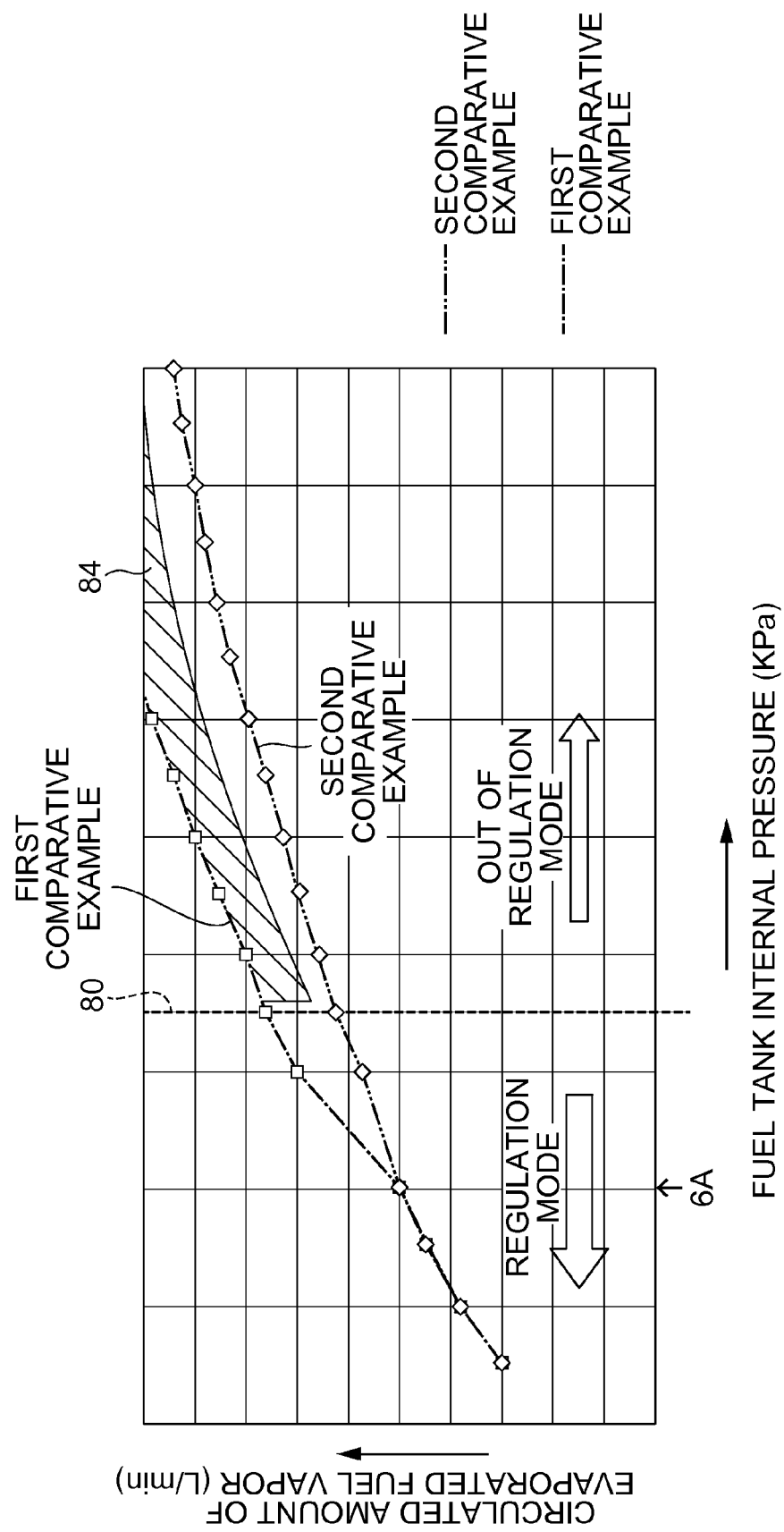
FIG. 7 is a graph showing the relationship between circulated amount of evaporated fuel vapor and internal pressure of a fuel tank, in the First Comparative Example and the Second Comparative Example.

Further, in FIG. 6 and FIG. 7, a First Comparative Example that is shown by the one-dot chain line is a structure that, due to the internal pressure of the fuel tank 14 increasing, changes from a state in which the inner diameter of the air-passage flow path of the variable valve is small, to a state in which the inner diameter of the air-passage flow path of the variable valve is large (a structure that changes in a single stage). Further, a Second Comparative Example that is shown by the two-dot chain line is a structure in which a variable valve is not provided at the breather pipe, and the inner diameter of the air-passage flow path does not change.

In FIG. 6, times when the internal pressure of the fuel tank 14 is equal to or less than reference value 80 are a regulation mode. Times when the internal pressure of the fuel tank 14 is greater (higher) than the reference value 80 are out of the regulation mode. The reference value 80 is set so as to become substantially equal to the internal pressure of the fuel tank 14 at the time when the refueling speed of the fuel that is refueled into the fuel tank 14 is 38 L/min.

Here, the fuel supplying device 12 of the First Example shown in FIG. 6 is described.

As shown in FIG. 6, in the fuel supplying device 12 of the First Example, there is a structure in which, in a case in which the refueling speed of the fuel is low and the internal pressure of the fuel tank 14 is low, i.e., in a case in which the internal pressure is less than the second predetermined value (6A), the inner diameter of the air-passage flow path of the variable valve 50 is small (state (1) in FIG. 6). At this time, as shown in FIG. 2, the front side wall portion 56B of the valve body 56 is made to press-contact the protrusion 68 due to the valve body 56 being urged toward the front wall portion 52B side of the case 52 by the force of the coil spring 64. Due thereto, the evaporated fuel vapor from the fuel tank 14 flows through the through-hole 58 of the valve body 56 as shown by arrow A. In this state, the inner diameter of the air-passage flow path at the position where the air-passage flow path is narrowest in the direction orthogonal to the axial direction (the air-passage flow path opening surface area at the narrowest position in the direction orthogonal to the axial direction) is small, and is, for example, around φ3 mm which is the diameter of the through-hole 58.

As shown in FIG. 6, when the refueling speed of the fuel is high, the internal pressure of the fuel tank 14 becomes high. In the fuel supplying device 12 of the First Example, there is a structure in which, when the internal pressure of the fuel tank 14 is equal to or greater than the second predetermined value (6A), the inner diameter of the air-passage flow path of the variable valve 50 becomes larger (state (2) in FIG. 6). At this time, as shown in FIG. 3, the valve body 56 moves within the case 52 toward the side opposite the fuel tank 14 due to the fluid pressure of the evaporated fuel vapor and against the force of the coil spring 64, and is positioned at an axial direction intermediate portion within the case 52. Due thereto, the evaporated fuel vapor flows through the through-hole 58 of the valve body 56 as shown by arrow A, and flows between the peripheral wall portion 56A of the valve body 56 and the peripheral wall portion 52A (the inner wall 53) of the case 52 as shown by arrow B. In this state, the inner diameter of the air-passage flow path at the position where the air-passage flow path is narrowest in the direction orthogonal to the axial direction (the air-passage flow path opening surface area at the narrowest position in the direction orthogonal to the axial direction) is large, and is equivalent to, for example, around φ6 mm. Due thereto, the amount of the evaporated fuel vapor that flows through the breather pipe 42 (the variable valve 50) becomes large, and the load on the evaporation system such as the canister 28 and the like can be reduced.

As shown in FIG. 6, when the refueling speed of the fuel becomes higher than 38 L/min that is prescribed by the regulations, the internal pressure of the fuel tank 14 becomes higher than the reference value 80. In the fuel supplying device 12 of the First Example, there is a structure in which, when the internal pressure of the fuel tank 14 is equal to or greater than the predetermined value (6B) that is greater than the reference value 80, the inner diameter of the air-passage flow path of the variable valve 50 becomes small (state (3) in FIG. 6). At this time, as shown in FIG. 4, the valve body 56 moves within the case 52 toward the side opposite the fuel tank 14 due to the fluid pressure of the evaporated fuel vapor and against the force of the coil spring 64, and the rear side wall portion 56C of the valve body 56 is made to press-contact the protrusion 70. Due thereto, the evaporated fuel vapor from the fuel tank 14 flows through the through-hole 58 of the valve body 56 as shown by arrow A. In this state, the inner diameter of the air-passage flow path at the position where the air-passage flow path is narrowest in the direction orthogonal to the axial direction (the air-passage flow path opening surface area at the narrowest position in the direction orthogonal to the axial direction) is small, and is, for example, around φ3 mm which is the diameter of the through-hole 58.

Due thereto, the circulated amount of the evaporated fuel vapor that flows through the breather pipe 42 (the variable valve 50) is reduced. Therefore, as compared with the structure of the First Comparative Example in which the inner diameter of the air-passage flow path does not change when the internal pressure of the fuel tank 14 is equal to or greater than the predetermined value (internal pressure 6B in FIG. 6), the evaporated fuel vapor that is circulated to the fuel refueling port 18 side being discharged into the atmosphere from the fuel refueling port 18 can be prevented or suppressed. Therefore, as shown by region 82 in FIG. 6, refueling emissions (substances that are released into the atmosphere) can be reduced.

Further, as shown in FIG. 6, in the Second Example, by making the inner diameters of the through-holes of the valve body of the variable valve 50 small, the circulated amount of the evaporated fuel vapor at times of high pressure (state (3) in FIG. 6) can be reduced more.

Further, as shown in FIG. 7, in the fuel supplying device of the First Comparative Example, there is a structure in which, from a state in which the inner diameter of the air-passage flow path of the variable valve is small, due to the internal pressure of the fuel tank 14 being equal to or greater than the second predetermined value (6A), the device changes to a state in which the inner diameter of the air-passage flow path of the variable valve is large. In this fuel supplying device, when the internal pressure of the fuel tank 14 is outside of the regulation mode and is high, due to the inner diameter of the air-passage flow path of the variable valve being large as shown by region 84 in FIG. 7, the circulated amount of evaporated fuel vapor becomes too large, and there is the possibility that some of the evaporated fuel vapor will be released into the atmosphere.

Moreover, as shown in FIG. 7, a variable valve is not provided in the fuel supplying device of the Second Comparative Example. Therefore, when the internal pressure of the fuel tank 14 becomes high in the regulation mode, the circulated amount of evaporated fuel vapor cannot be made large as compared with the First Comparative Example, and there is the possibility that load will be placed on the evaporation system such as the canister 28 and the like.

In contrast, in the fuel supplying device 12 of the First Example, from the state shown in FIG. 2 in which the inner diameter of the air-passage flow path of the variable valve 50 is small, due to the internal pressure of the fuel tank 14 becoming high, there becomes the state (see FIG. 3) in which the inner diameter of the air-passage flow path of the variable valve 50 is large, and, due to the internal pressure of the fuel tank 14 becoming even higher, there becomes the state (see FIG. 4) in which the inner diameter of the air-passage flow path of the variable valve 50 is small. Therefore, when the internal pressure of the fuel tank 14 becomes high in the regulation mode, due to the circulated amount of the evaporated fuel vapor becoming large, the load on the evaporation system such as the canister 28 and the like can be decreased. Further, when the internal pressure of the fuel tank 14 becomes high out of the regulation mode, the circulated amount of the evaporated fuel vapor can be reduced, and the evaporated fuel vapor being discharged into the atmosphere from the fuel refueling port 18 can be prevented or suppressed.

Note that the structure of the valve body of the variable valve 50 is not limited to the structure of the above-described embodiment. In the technique of the present disclosure, the structure of the valve body of the variable valve 50 can be changed provided that there is a structure in which the inner diameter of the air-passage flow path (the air-passage flow path opening surface area in the direction orthogonal to the axial direction) is made small in a case in which the internal pressure of the fuel tank is equal to or greater than a predetermined value.

All publications, patent applications, and technical standards mentioned in the present specification are incorporated by reference into the present specification to the same extent as if such individual publication, patent application, or technical standard was specifically and individually indicated to be incorporated by reference.

What is claimed is:
1. A fuel supplying device comprising:
  a fuel tank that can accommodate fuel at an interior thereof;
  a circulation flow path that is connected to the interior of the fuel tank and to a fuel refueling port side, and that circulates evaporated fuel vapor that is within the fuel tank to the fuel refueling port side;

a variable valve that is provided at the circulation flow path, and that adjusts a circulated amount of the evaporated fuel vapor; and an air-passage flow path inner diameter changing means that is provided at the variable valve, and that is for changing an inner diameter of an air-passage flow path, through which the evaporated fuel vapor flows, in accordance with an internal pressure of the fuel tank, wherein:

the air-passage flow path inner diameter changing means comprises:

a valve body that is disposed having an interval between the valve body and an inner wall of the variable valve, and that moves within the variable valve in accordance with the internal pressure of the fuel tank; and a spring that urges the valve body toward a fuel tank side, wherein the air-passage flow path inner diameter changing means is structured so as to, when the internal pressure of the fuel tank is equal to or greater than a first predetermined value, make the valve body move toward the fuel refueling port side against a force of the spring, and make the inner diameter of the air-passage flow path smaller.

2. The fuel supplying device of claim 1, wherein changing of the inner diameter of the air-passage flow path is carried out by fluid pressure of the evaporated fuel vapor that flows through the variable valve.

3. The fuel supplying device of claim 1, wherein:

there exists a second predetermined value that is smaller than the first predetermined value, and the air-passage flow path inner diameter changing means is structured so as to, when the internal pressure of the fuel tank is less than the second predetermined value, make the inner diameter of the air-passage flow path smaller, and, when the internal pressure of the fuel tank is equal to or greater than to the second predetermined value and smaller than the first predetermined value, make the inner diameter of the air-passage flow path larger, and further, when the internal pressure of the fuel tank is equal to or greater than the first predetermined value, make the inner diameter of the air-passage flow path smaller.

4. The fuel supplying device of claim 1, wherein through-holes, through which the evaporated fuel vapor flows, are provided in the valve body.

5. The fuel supplying device of claim 4, wherein:

the first predetermined value is greater than a second predetermined value, and the air-passage flow path inner diameter changing means is structured such that:

when the internal pressure of the fuel tank is less than the second predetermined value, the valve body is positioned at a fuel tank side of the variable valve interior, and the evaporated fuel vapor flows through the through-holes;

when the internal pressure of the fuel tank is equal to or greater than the second predetermined value and smaller than the first predetermined value, the valve body moves to an axial direction intermediate portion of the variable valve interior, and the evaporated fuel vapor flows through the through-holes and between the valve body and the inner wall; and when the internal pressure of the fuel tank further is equal to or greater than the first predetermined value, the valve body moves to the fuel refueling port side of the variable valve interior, and the evaporated fuel vapor flows through the through-holes.

* * * * *